(12) United States Patent
Yoshitomi et al.

(10) Patent No.: US 9,301,541 B2
(45) Date of Patent: Apr. 5, 2016

(54) PROCESS FOR PRODUCTION OF PROTEIN-CONTAINING FOOD EMPLOYING CONTINUOUS HEATING METHOD BY INTERNAL HEATING

(75) Inventors: Bunji Yoshitomi, Hachioji (JP); Tomonori Hashidate, Hachioji (JP); Ken Mizuki, Hachioji (JP)

(73) Assignee: NIPPON SUISAN KAISHA, LTD., Tokyo (JP)

( * ) Notice: Subject to any disclaimer, the term of this patent is extended or adjusted under 35 U.S.C. 154(b) by 138 days.

(21) Appl. No.: 13/882,870

(22) PCT Filed: Nov. 1, 2011

(86) PCT No.: PCT/JP2011/075136
§ 371 (c)(1),
(2), (4) Date: May 1, 2013

(87) PCT Pub. No.: WO2012/060348
PCT Pub. Date: May 10, 2012

(65) Prior Publication Data
US 2013/0224367 A1    Aug. 29, 2013

(30) Foreign Application Priority Data

Nov. 2, 2010  (JP) ................................. 2010-246390
Feb. 2, 2011  (JP) ................................. 2011-020998
Feb. 4, 2011  (JP) ................................. 2011-022872
Jul. 15, 2011 (JP) ................................. 2011-156494

(51) Int. Cl.
*A23L 1/00*    (2006.01)
*A23L 1/01*    (2006.01)
(Continued)

(52) U.S. Cl.
CPC ............. *A23L 1/0076* (2013.01); *A23L 1/0128* (2013.01); *A23L 1/3175* (2013.01); *A23L 1/3177* (2013.01); *A23L 1/3255* (2013.01)

(58) Field of Classification Search
CPC .................................................... A23L 1/0076
See application file for complete search history.

(56) References Cited

U.S. PATENT DOCUMENTS 4,659,303 A * 4/1987 Straka et al. ............... 425/376.1
5,173,321 A   12/1992 Hosogoe et al.

FOREIGN PATENT DOCUMENTS

JP   55-048371   4/1980
JP   56-005075   1/1981
(Continued)

OTHER PUBLICATIONS

Yongsawatdigul et al., "Ohmic Heating Maximizes Gel Functionality of Pacific Whiting Surimi"—Journal of Food Science, vol. 60, No. 1, 1996, p. 10-14.*

(Continued)

*Primary Examiner* — Elizabeth Gwartney
(74) *Attorney, Agent, or Firm* — Hamre, Schumann, Mueller & Larson, P.C.

(57) ABSTRACT

Provided is a method for producing a processed food which is produced by continuously heating/molding a fluid raw material containing a protein, a lipid, and water. A method for heating a material to be heated continuously by an internal heating system while moving the material in a tube comprising: (a) arranging the tube vertically or substantially vertically (a tilt of not greater than 15°) and heating/molding a mixture while feeding the mixture upward from a bottom in the tube and/or (b) heating/molding the mixture while rotating the tube around a rotation axis, the rotation axis being a center line in a length direction of the tube. The internal heating system is preferably microwave heating, Joule heating, or high-frequency heating. The method for producing a processed protein food employs the heating/molding method for production of a processed protein food wherein a material to be heated, which is a fluid mixture containing a protein, a lipid, and water, is molded by thermally coagulating the mixture continuously by an internal heating system while moving the mixture in a tube.

9 Claims, 5 Drawing Sheets

(51) Int. Cl.
*A23L 1/317* (2006.01)
*A23L 1/325* (2006.01)

(56) References Cited

FOREIGN PATENT DOCUMENTS

| JP | 56-071188 U | 6/1981 |
|---|---|---|
| JP | 57-089487 U | 6/1982 |
| JP | 04-218345 | 8/1992 |
| JP | 05-20590 U | 3/1993 |
| JP | 5-020590 U | 3/1993 |
| JP | 05-33024 | 5/1993 |
| JP | 09-121818 | 5/1997 |
| JP | 2000-083627 | 3/2000 |
| JP | 3179686 | 4/2001 |
| JP | 4143948 | 6/2001 |
| JP | 2001-275621 | 10/2001 |
| JP | 2002-142724 | 5/2002 |
| JP | 2003-289838 | 10/2003 |
| JP | 2003-325138 | 11/2003 |
| JP | 3614360 | 11/2004 |
| JP | 4065768 | 1/2008 |
| JP | 2009-207498 | 9/2009 |
| JP | 2010-068786 | 4/2010 |

OTHER PUBLICATIONS

Nicklason et al., "Simultaneous Heating, Forming and Extruding of Surimi-Based Products"—Journal of Food Engineering, vol. 9, 1989, p. 219-229.*

Murray et al., "Improved Utilization of Fish Protein-Co-extrusion of Mechanically Deboned Salted Minced Fish"—Canadian Institute of Food Science and Technology Journal, vol. 13, Issue 3, 1980, Abstract.*

Kyoko Shiota, "Studies on Physical Properties of Beef Patties and Sausages by Adding Fat/Oil", Kassui Ronbunshu, 1994, vol. 37, pp. 9-19.

* cited by examiner

PROCESS FOR PRODUCTION OF PROTEIN-CONTAINING FOOD EMPLOYING CONTINUOUS HEATING METHOD BY INTERNAL HEATING

TECHNICAL FIELD

The present invention relates to a method for producing a processed protein food, which is subjected to a heating/molding and contains a protein such as livestock meat, chicken meat, seafood, egg, vegetable, and the like as a primary raw material, employing continuous heating method for a material to be heated by an internal heating system. The present invention relates to a production method by performing continuously and stably hot extrusion molding of a raw material forming an irreversible gel by the heating from a heating tube by an internal heating system and a product obtained by the production method. The present invention employs an internal heating method, such as Joule heating, microwave heating, or high-frequency heating as a heating method.

BACKGROUND ART

The heating step for food processing is one of the important processes for inducing quality changes in an object and determining the nature thereof, regardless of the type or purpose of the object. A variety of heating methods are known, and these are classified into external heating (direct heating and indirect heating) and internal heating (self-heating). Typical examples of the internal heating system are Joule heating, microwave heating, and high-frequency heating.

Joule heating is used, for instance, for the purpose of disinfection and endogenous enzyme deactivation and the like for fluid foods, such as juices, sauces, ketchup, and mayonnaise (Patent Documents 1 to 4, and the like). A technology for production of meat-paste products has been disclosed whereby after preheating by Joule heating, the product is molded and then the molded product is further subjected to Joule heating (Patent Document 5). Moreover, when producing fish-paste products such as chikuwa, satsuma-age, or crab-flavored kamaboko, Joule heating is used to heat the fish paste after molding or Joule heating is used for preheating of the fish paste before molding (Patent Documents 6 to 9, and the like).

Microwave heating is widely used for a microwave oven. Patent Documents 10 and 11 disclose a method for heating/molding a skinless paste product using microwave heating.

High-frequency heating is a heating system based on the same theory as microwave heating, but uses an electromagnetic wave of a smaller frequency than microwaves.

Examples of sausages known as a processed mincemeat product include a fish sausage obtained by mixing a fish meat paste and secondary raw materials, filling the mixture in a casing, and heating, and a livestock meat sausage obtained by filling a meat paste in an edible casing made from sheep intestine, and the like, smoking, and heating before eating. These are foods that are molded in casings and then heated.

BACKGROUND ART DOCUMENTS

Patent Documents

Patent Document 1: Japanese Examined Patent Application Publication No. H05-033024
Patent Document 2: Japanese Patent No. 4143948
Patent Document 3: Japanese Patent No. 4065768
Patent Document 4: Japanese Unexamined Patent Application Publication No. 2003-289838
Patent Document 5: Japanese Unexamined Patent Application Publication No. 2002-142724
Patent Document 6: Japanese Unexamined Utility Model Application Publication No. H05-020590
Patent Document 7: Japanese Unexamined Patent Application Publication No. 1409-121818
Patent Document 8: Japanese Patent No. 3179686
Patent Document 9: Japanese Patent No. 3614360
Patent Document 10: Japanese Unexamined Patent Application Publication No. S55-048371.
Patent Document 11: Japanese Unexamined Patent Application Publication No. 2003-325138

SUMMARY OF THE INVENTION

Problems to be Solved by the Invention

An object of the present invention is to provide a method for heating/molding a fluid material to be heated continuously. Another object of the present invention is to produce a thermal coagulating processed protein food produced via a heating step, such as a sausage, continuously. Examples of processed foods coagulated by heating include foods made from a livestock meat or a fish meat, foods made from egg or a milk protein, and foods made from a vegetable protein such as a soy protein, which have each been produced by different heating/processing methods in the past.

A molding step for determining the final product shape prior to the heating step is essential when heating/processing a fluid raw material, such as a ground livestock meat or a minced fish meat. In other words, the molding step and the heating step are separate steps and therefore, the production steps are complicated and this complexity becomes the cause of a reduction in production efficiency. For instance, in the case of a food to be processed as a paste by making a livestock meat or a marine product-derived meat into mincemeat, it is necessary to mold the paste on a member such as a rod or a plate for supporting the paste, as in the case of chikuwa or kamaboko, or to separately mold the product by filling it into a casing, as with a sausage.

However, when continuous production of a processed food is attempted by extruding the processed food from a tube while heating the food in the tube, a gel having a micronetwork structure is formed as a result of heat denaturation of primarily the myofibrillar-derived salt-soluble proteins contained in the livestock meat or marine product-derived meat. Consequently, fluidity is lost. The flow path becomes clogged when the meat deposits on the processing equipment. Therefore, it becomes difficult to perform heating/processing a material to be processed by a method that is dependent on the self-fluidity of the material while continuously moving the material. Although there are also reports of methods of continuous heating/molding using Joule heating or microwave heating such as described under Background of the Invention, these are not of a high technical level sufficient for practical use.

An object of the present invention is to continuously produce a material to be heat processed made mainly from a livestock meat or a marine product-derived meat.

Means for Solving the Problems

The "heating" in food production steps is an extremely important step that imparts a variety of properties and characteristics to a material to be processed. By using a variety of heating systems in accordance with the use and purpose of the material to be processed, improvement of production efficiency, production of high-quality products, and differentiation of products are possible.

There are examples of primary heating at a low temperature of approximately from 40 to 50° C. using internal heating such as Joule heating, microwave heating, or high-frequency heating in order to impart and improve moldability of a meat or processed seafood products. In such a case, self-fluidity of a material to be heated is maintained in a heating region and it is possible to perform internal heating while continuously moving the material to be heated using a pump, and the like by employing this self-fluidity. Nevertheless, during the heating steps for eventually obtaining a final product, which are performed in at least a temperature range under which salt-soluble animal proteins contained in the material to be heated are gelatinized as a result of heat denaturation, it is difficult to produce a product of excellent quality by continuous internal heating/processing using the self-fluidity of the material to be heated.

Food materials made mainly from a livestock meat or a marine product-derived meat, particularly, salt-soluble proteins such as the myofibrillar proteins, primarily, myosin and actomyosin, that are contained in these materials, go through an irreversible structural change due to heating and are converted to a firm gel having a micro-network structure. Therefore, they tend to clog the inside of the tube.

The inventors studied methods for producing processed protein foods using an internal heating system and achieved the present invention upon discovering that a processed protein food can be produced such that the heating efficiency is high, there is a reduction in irregularities (heating irregularities), such as overheating or insufficient heating, and the entire material to be heated is uniformly heated by changing the extrusion direction of the material to be heated from horizontal to vertical and by rotating the heating tube, through which the material to be heated passes, around a rotation axis, the rotation axis being a center line in a length direction of the tube.

The various methods and devices for heating a livestock meat or marine product-derived thermal coagulating proteins continuously using internal heating system are proposed, but there are major disadvantages with the use and operation thereof. All conventional methods use a system and equipment to heat a material to be heated while moving the material horizontally with respect to gravity (hereinafter, this system is referred to as a horizontal extrusion system (FIG. 1)).

In the case of this horizontal extrusion system, if the material to be heated is heated at a temperature range under which the temperature of the material to be heated is low and will not be gelatinized, it will be well, however, if the material to be heated is heated at a temperature range under which the protein is subjected to heat denaturation and gelatinization, such as from 70 to 120° C., fluidity is lost due to the gelatinization and the material to be heated clogs the flow path. At the same time, the generated steam has a lower specific gravity than the surrounding substances and therefore moves to the upper portion of the heating tube (FIG. 2). However, the steam release path in the tube becomes clogged and the pressure inside the tube therefore rises. A flushing phenomenon occurs whereby the steam and the material to be heated are suddenly emitted, and stable extrusion of the heated material is impossible. However, the inventors discovered that by heating a material to be heated while continuously moving the material in a direction opposite a direction of gravity taken in the heating tube as the direction of gravity, that is, as vertical (vertical extrusion system), the steam generated in the tube during heating moves smoothly in the same direction as the heated material (FIG. 3) and thus it is possible to perform stable extrusion of the heated material.

The present invention is a method for producing a processed protein food according to (1) to (9) and a processed protein food according to (10) to (18).

(1) A method for producing a processed protein food by thermally coagulating and molding a fluid mixture containing a protein, a lipid, and water continuously by an internal heating system while moving the mixture in a tube, the method comprising:

(a) disposing the tube vertically or substantially vertically (a tilt of not greater than 15°) and heating/molding the mixture while feeding the mixture upward from a bottom of the tube, and/or (b) heating/molding the mixture while rotating the tube around a rotation axis, the rotation axis being a center line in a length direction of the tube.

(2) The method for producing a processed protein food according to (1), wherein the internal heating system is microwave heating, joule heating, or high-frequency heating.

(3) The method for producing a processed protein food according to (1) or (2), wherein the heating is performed such that a temperature at the center of the mixture is from 70 to 120° C.

(4) The method for producing a processed protein food according to any of (1) to (3), wherein a rotation speed is from 5 to 30 rpm.

(5) The method for producing a processed protein food according to any of (1) to (4), wherein a lubricant is fed between the tube and the mixture.

(6) The method for producing a processed protein food according to any of (1) to (5), wherein the mixture is introduced to the tube after being subjected to degasification.

(7) The method for producing a processed protein food according to any of (1) to (6), wherein after the heating/molding in the tube, the processed protein food is cut vertically into two or more parts by a vertical cutting means disposed near an outlet of the tube.

(8) The method for producing a processed protein food according to (7), wherein the vertical cutting means is a linear object or a blade disposed in a path of the processed protein food being extruded from the tube.

(9) The method for producing a processed protein food according to any of (1) to (8), wherein a nozzle for feeding another mixture is disposed in a pipe feeding the mixture into the tube, the mixture and the other mixture are simultaneously fed into the tube, and the mixtures are subjected to heating/molding in the tube to produce a food having a form wherein the other mixture passes through a middle portion of the processed protein food.

(10) A processed protein food produced by a method for producing a processed protein food described in any one of (1) to (9).

(11) The processed protein food according to (10), wherein a protein raw material of the processed protein food is fish meat, fish egg, livestock meat, chicken meat, chicken egg, or bean.

(12) The processed protein food according to (10) or (11), wherein the processed protein food has a lipid content of from 2 to 35 wt. % in the raw material.

(13) The processed protein food according to (11) or (12), wherein the raw material of the processed protein food is obtained by mixing and thoroughly kneading a secondary raw material with a primary raw material comprising a livestock meat or a marine product-derived meat mainly containing a myofibrillar-derived salt-soluble protein, and the kneaded product has a lipid content of from 2 to 35 wt. %.

(14) The processed protein food according to (13), wherein the processed protein food is a ham/sausage without a casing.

(15) The processed protein food according to any one of (10) to (14), wherein the lipid contained in the raw material contains a solid oil/fat that retains a solid state at a temperature of the mixture before heating.

(16) The processed protein food according to (15) that is an edible oil/fat, wherein a melting point of the edible oil/fat is not less than 7° C. greater than the temperature of the mixture before heating.

(17) The processed protein food according to (15) that is an edible oil/fat, having a melting point of not less than 15° C.

(18) The processed protein food according to any of (15) to (17), wherein a solid oil/fat content in the mixture is not less than 2 wt. %.

Advantage of the Invention

According to the heating method of the present invention, the material to be heated is moved in the direction opposite the direction of gravity and the direction of movement of the material to be heated is thereby brought to coincide with the direction of natural release of the steam generated inside the tube. By using the heating tube as a chimney and preventing the steam from stagnating inside the tube and the internal pressure from increasing, stable smooth movement of the material to be heated is possible (FIG. 3). Furthermore, the steam that rises along the wall face of the heating tube alleviates the dynamic friction resistance between the tube wall face and the material to be heated and has a function of facilitating smooth movement of the material to be heated. Moreover, by vertically placing the heating tube, the internal pressure of the material to be heated filled inside the tube increases under the gravity of its own weight and suppresses expansion of the steam generated by heating and the material to be heated. The combination of these multiple effects makes possible a continuous heating method and a continuous hot extrusion molding method by an effective internal heating system, as well as production of a food. Moreover, the material to be heated inside the tube can be uniformly heated by rotating the heating tube, through which the material to be heated passes, around a rotation axis, the rotation axis being a center line in a length direction of the tube. When this effect is combined with the above-mentioned multiple effects, more stable production is possible.

MODE FOR CARRYING OUT THE INVENTION

Figure 1:
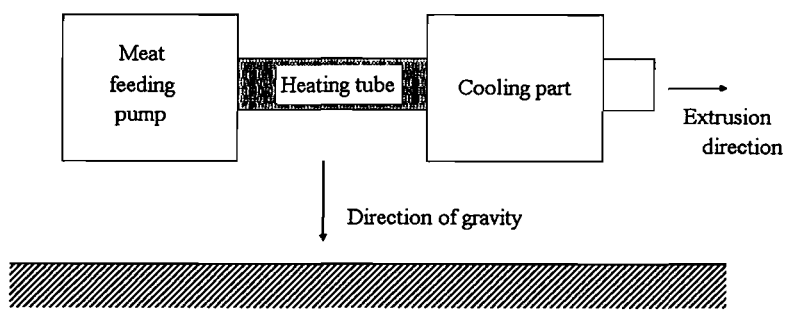
FIG. 1 is a schematic drawing illustrating an embodiment of a horizontal extrusion system of prior art.

According to the present invention, a method for heating a material to be heated continuously by an internal heating system while moving the material in a tube includes "a heating method wherein the tube is arranged vertically or substantially vertically (a tilt of not greater than 15°) and the material to be heated is heated while feeding the material upward from a bottom of the tube" and/or "a heating method wherein heating is performed while rotating the tube around a rotation axis, the rotation axis being a center line in a length direction of the tube".

According to the present invention, although the material to be heated can be any type ranging from liquid to solid, the material to be heated must have fluidity such that it can be fed to the tube by a pump, and the like at least when in the form of a raw material. The present invention is particularly appropriate for heating of a raw material having a specific viscosity. When the raw material is one such as water having a low viscosity, a countercurrent will be produced during movement, even if the water is continuously heated inside the tube. Thus, there will be no temperature differences and there will be no problems, even if the extrusion system is a horizontal extrusion system. However, when viscosity is high, it becomes difficult to conduct heat by a countercurrent and therefore, local temperature differences tend to occur and stable extrusion is not possible.

Specifically, the present invention is appropriate for natural products and food materials containing water, a protein, a starch, and the like. The present invention is particularly appropriate for processing food materials such as a meat paste or egg containing a protein gelatinized due to heating. The heating by the vertical extrusion system of the present invention is appropriate for a continuous heating of a substance that will not be gelatinized as well, as long as that substance is one containing a protein and sugar, such as a food having a high viscosity, for instance, a food having miso-like properties, a food having cream-like properties, or a food having gruel-like properties, or a medical drug raw material containing natural-derived components, medical drug component, health food raw material, culture medium, and the like.

The term "tube" in the present invention is preferably a member through the inside of which the material to be heated can pass, is capable of transmitting internal heat, that is, microwaves or high-frequency waves, and has electrical insulation performance and heat resistance. In addition, preferably, the surface of the tube is treated with a member to which the material to be heated will not adhere, such as a synthetic resin, a silicon resin, or a fluorine resin. Although the tube diameter depends on the heating method and heating energy, in the case of microwave heating, the penetration of half depth of microwave of the raw material used in the present invention is not deep and therefore, the tube preferably has a diameter of not more than 40 mm, preferably not more than 30 mm. In the case of high-frequency heating, the penetration of half depth of electromagnetic waves is deeper than that of microwaves and therefore, the tube can be wider. Joule heating is based on a different heating theory than microwave heating and therefore, theoretically the tube diameter depends on the size of the heating electrode and can be 200 mm. The length of the tube is adjusted to the length that takes into consideration the speed of movement of the material to be heated in the tube and the required end-point temperature.

According to the present invention, the phrase "placing the tube vertically or substantially vertically (a tilt of not greater than 15°)" means that a portion of the tube to be heated by the internal heating system is arranged vertically or substantially vertically, but the portion before and after the heating is not necessarily vertical. As a rule, vertical is preferred, but depending on the material to be heated, the effect will not be greatly compromised if the tube is inclined by approximately not greater than 15°, preferably not greater than 5°.

Figure 4:
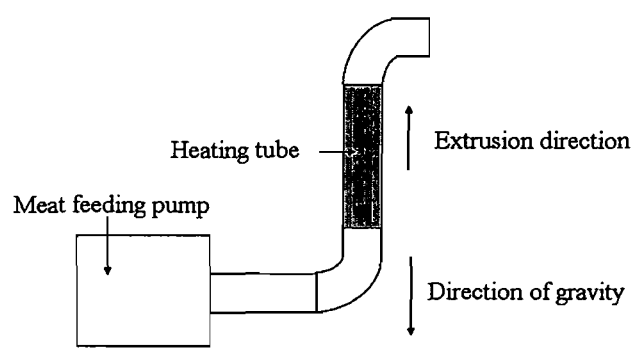
FIG. 4 is a schematic drawing illustrating an embodiment of a heating device used in the present invention.

Specifically, for instance, the material to be heated is fed to the heating tube as illustrated in FIG. 4. An internal heating-type heating device is disposed outward of the heating tube portion. Examples are a device for microwave heating illustrated in FIG. 5 and a device for Joule heating illustrated in FIG. 6.

The term "Joule heating" refers to a type of internal heating also called electrical heating. It is the method whereby electricity is passed directly to a material to be heated such as a food and heat is build up by the electrical resistance of the material to be heated. A device such as disclosed in Patent Documents 1 to 4 can be used as a Joule heating device for continuous heating of fluid foods. Basically, the Joule heating device has an insulated tube and a pair of electrodes disposed at the tube, and the electrodes are connected to a power source. This device can be used for the production method of the present invention as long as a pump is connected to the tube such that a material to be heated can be continuously fed to the tube and there is a receptacle or a cooling part for receiving the heated food. There are means for preventing scorching of the food inside the tube, and there is a technology for disposing a temperature sensor for controlling temperature when a fluid food is to be subjected to Joule heating inside the tube. These technologies can be used in the present invention as well.

For instance, a device with a voltage of approximately from 150 to 400 V and a current of approximately from 10 to 30 A can be used.

The term "microwave heating" refers to a heating method using a vigorous vibration of an electric dipole such as water molecules contained in the material to be heated by high frequency, and the theory of microwave heating is commonly used for home microwave ovens. A device disclosed in Patent Documents 10 and 11 can be used as the microwave heating device. Basically, a device constituted by, for example, a fluorine resin heating tube with high-frequency permeability and equipment that irradiates the tube part with microwaves can be used in the production method of the present invention as long as a pump is connected to the tube such that a material to be heated can be continuously fed to the tube and there is a receptacle or a cooling part for receiving the heated food.

For instance, a device of 2450 Hz, 200 V, and 20 A can be used.

Although high-frequency heating is a heating system that uses electromagnetic waves of a lower frequency than microwave heating, the device and theory are basically the same as microwave heating.

According to the present invention, "heating while rotating the tube around a rotation axis, the rotation axis being a center line taken in a length direction of the tube" means that heating is performed while feeding a material to be heated to a heating tube and rotating the tube itself around a rotation axis, the rotation axis being a center line in the length direction.

Figure 7:
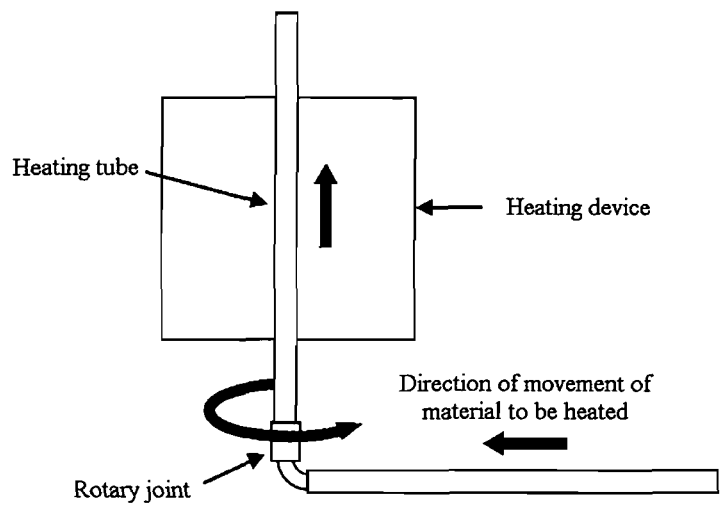
FIG. 7 is a schematic drawing illustrating an embodiment when the tube is rotated using microwave heating as the internal heating system of the present invention.

For instance, there are microwave heating devices that will uniformly heat by disposing a microwave generator at a phase of 120° in the vicinity of the tube. However, even these devices produce heating irregularities depending on the position of the microwave generator and the microwave absorption rate. This difference is particularly obvious for the material to be heated having a high viscosity, and is related to poor commercial quality. However, the inventors discovered that by rotating the tube through which the material to be heated passes, it is possible to reduce heating irregularities and greatly improve commercial quality. A thermally coagulated processed protein food will not be destroyed or torn inside the tube even when the tube is rotated, and the effect of uniform heating can be realized by rotating the material to be heated together with the tube. The rotation speed should be adjusted as needed in accordance with the type of material to be heated and the length of the heating portion of the tube, but a sufficient effect is obtained at a speed of approximately from 5 to 30 rpm, preferably approximately from 10 to 20 rpm. FIG. 7 is a schematic drawing of an embodiment when the tube is rotated. A rotary joint, and the like is disposed between a front tube part connected to the pump for feeding the material to be heated and the rotating tube to allow the tube to rotate freely. A driving device with which the rotation speed can be adjusted is attached to the tube and the rotation speed of the tube can be adjusted optionally. On the other hand, the material to be heated that has been heated inside the tube is extruded from the outlet at the end of the tube and fed to the next step via a guide, a conveyor, and the like. When combined with the method for vertical extrusion of the material to be heated, this method exhibits a more stable effect.

The "processed protein food produced by thermally coagulating and molding a fluid mixture containing a protein, a lipid, and water continuously by an internal heating system while moving the mixture in a tube" is a food which can be produced when the protein is thermally coagulated, such as a fish sausage.

Processed products obtained by heating a kneaded meat made mainly from a livestock meat or a marine product-derived meat and produced by adding any food materials thereto and kneading are generally meat or marine processed products and examples are ham and sausages, hamburger, meatloaf, and fish-paste product. The industrial production of these processed products is performed in two separate steps, a molding step and a heating step, which include filling in an any mold or casing.

Figure 8:
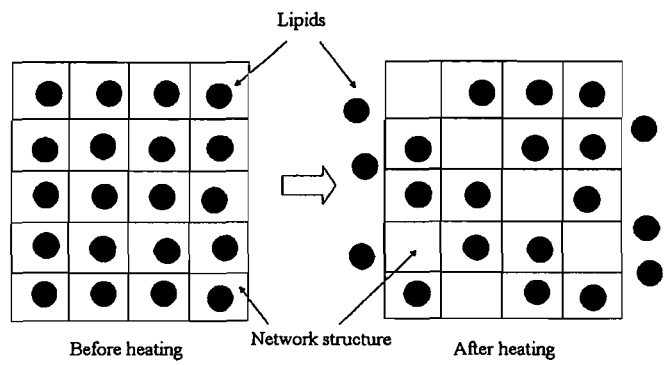
FIG. 8 is a schematic drawing illustrating a status change in a lipid contained in the material to be heated due to heating.

According to the present invention, by adding lipids to a kneaded meat made mainly from a livestock meat or a marine product-derived meat and produced by adding any food materials thereto and kneading, even after the kneaded meat is gelatinized due to heating, the lipids are retained in the heated gel, but a portion of the lipids are released (FIG. 8). The released lipids have a lubricating effect that reduces the movement friction between the heating tube inner walls and the heated gel. As a result, it is possible to maintain smooth transport property of the heated gel.

A fish sausage is produced by mixing minced fish meat with secondary raw materials such as table salt, table sugar and other seasonings and spices, starches, and vegetable oils and kneading into a paste, filling the paste into a synthetic resin casing, and subjecting the product to retort heating. However, a fish sausage is produced by thermally coagulating this paste while moving the paste in a tube without filling in the casing. As a result, it is possible to continuously produce a fish sausage without using a casing.

The present invention is not limited to a fish sausage. Any processed protein food can be produced by this method as long as the processed protein food is produced by thermally coagulating a liquid to paste-like raw material containing protein.

According to the definition of "ordinary fish sausage" of the "Quality Labeling Standard for Fish Ham and Fish Sausage" of the Ministry of Agriculture, Forestry and Fisheries of Japan (Notification No. 1658 of Ministry of Agriculture, Forestry and Fisheries, enacted on Dec. 19, 2000; Notification No. 1368 of Ministry of Agriculture, Forestry and Fisheries, final version 2008), fish ham is defined as "(1) salted pieces of fish meat (fish meat pieces hereinafter) (including meat from whales or other aquatic animals other than fish; the same hereinafter), or mixtures of fish meat and salted pieces of other edible meats (pork, beef, horse meat, mutton and lamb, goat meat or chevon, rabbit meat or poultry; the same hereinafter) or vegetable proteins having carneous tissue (carneous protein hereinafter) or fatty layers (limited to 5 g or more of carneous vegetable proteins or fatty layers), to which fillers are added or not added and seasonings and spices are added, or to which an edible oil/fat, auxiliary binders, antioxidants, preservatives, and the like have been added and which have been filled in a casing and heated (provided that the weight ratio of fish meat in the raw material exceeds 50%, the weight ratio of fish meat pieces in the raw material is 20% or greater, the weight ratio of filler in the raw material is less than 50%, and the weight ratio of vegetable protein in the raw material is 20% or less) and (2) (1) that has been cut into blocks or thin slices and packaged".

Moreover, fish sausage is defined as "(1) ground fish meat or minced fish meat, or a mixture of ground or minced fish meat and a ground edible meat, which has been kneaded after optionally adding seasonings and spices, starches, powdered vegetable protein or other binders, edible oils and fats, auxiliary binders, antioxidants, preservatives, and the like and has a fat content of 2% or greater (simply referred to as "kneaded fish meat" hereinafter), that is filled into a casing and heated (provided that the weight ratio of fish meat in the raw material exceeds 50% and the weight ratio of vegetable protein in the raw material is 20% or less; the same as for special fish sausages) and (2) (1) that has been cut into blocks or thin slices and packaged."

Although the "fish ham and sausages" according to the present invention takes account of fish ham and sausage by the above-mentioned definition, it includes the heat processed product of kneaded raw material containing 30 wt. % or greater of fish meat and having a fat content of 2 wt. % or greater. However, the present invention is a casing-free product that has been heated without being filled into a casing.

The raw material of the "processed protein food" of the present invention can be meat or seafood, as well as egg protein, milk protein, or vegetable protein. Any of these are the same in terms of thermal coagulation of the protein due to heating and can be formed into a processed food by the same method.

Methods for heating raw materials and products in the food production steps can be classified into the external heating system (direct heating and indirect heating) and the internal heating system. The external heating system requires a heat medium having a temperature higher than a target temperature for heating the material to be heated to a target temperature. In other words, a temperature difference is essential to move thermal energy between the material to be heated and the heat medium and it is unavoidable that a portion of the material to be heated will reach a temperature higher than the target heating temperature. Therefore, in order to prevent overheating, heating by an external heating device requires adjustment of the heating temperature and time, agitation of the material to be heated, and the like. In contrast to this, the internal heating system such as Joule heating or microwave heating uses the self-heating of the material to be heated. Therefore, internal heating system is known to have the following characteristics.

1) The materials are not heated to a temperature above a specific temperature because there is no heat medium.

2) Accurate temperature adjustment is possible because temperature of the material to be heated is controlled electrically.

3) It is possible to heat regardless of the viscosity of the food. Moreover, rapid heating is possible, even for a liquid having a low heat conductivity.

4) Uniform heating is possible, even for a food containing solid matter.

5) Uniform and rapid heating is possible.

The reason why the heating method of the present invention functions well with foods that lose fluidity as a result of coagulation inside the tube is that the long axis of the heating tube stands in the direction of gravity, in other words, vertically, and internal heating is performed while the material to be heated continuously moves in the tube in the direction opposite the direction of gravity. Moreover, a lipid is added to the raw material that is primarily protein, or a lipid derived from the raw material is present.

By using a vertical extrusion system, the steam generated inside the tube during heating moves in the tube as with a chimney, in the direction opposite the direction of gravity, in other words, upward. Furthermore, because the material to be heated moves upward in the tube, the direction of movement of the steam generated in the tube and the material to be heated coincide. As a result, internal stagnation of steam is not produced and the material to be heated can be extruded stably. Moreover, the steam that rises along the wall face of the heating tube reduces the dynamic friction resistance between the tube wall face and the material to be heated and facilitates smooth movement of the material to be heated.

In addition, by using the vertical extrusion system, the material to be heated in the heating tube is constantly under the gravity of its own weight in proportion to the length of the long axis of the heating tube and the internal pressure increases. Therefore, the boiling point of the water contained in the raw material rises and stable heating up to a high temperature is possible, even at normal pressure. Furthermore, thermal expansion of the steam that is generated inside the heating tube due to heating and the material to be heated is suppressed and this has the effect of stabilizing extrusion of the material to be heated.

The salt-soluble protein constituting the myofibrillar fibers contained in the livestock meat or marine product-derived meat is dissolved by the addition of salt. The salt-soluble protein is a fibrous protein and has both hydrophobic and hydrophilic groups in its structure. Therefore, it has an emulsifying effect. Consequently, when salt is added to a kneaded meat, the meat is thoroughly ground, and then a lipid is added and kneaded, a uniform emulsion is obtained.

Gelatinization due to heating is the phenomenon in which the spatial structure of a salt-soluble protein that has been dissolved by salt is altered due to heating to form a micronetwork structure of complex three-dimensional intertwining. The salt-soluble protein whose spatial structure has been altered due to heating simultaneously exhibits a reduction in emulsifiability. Although the salt-soluble protein releases emulsified lipids once, these lipids are taken up by the micro-network structure formed simultaneously and retained in that structure. The lipid released to outside the micro-network structure functions as a lubricant. Therefore, the dynamic friction resistance between the gelled salt-soluble protein and inner walls of the heating device is reduced, transportability is improved, and there is a reduction in deposition on the equipment.

As a result of these multiple factors, it is possible to literally continuously produce a fish sausage, and the like.

From 2 to 35 wt. % of a lipid is preferably added to the raw material of the processed protein food produced from a raw material containing a protein, a lipid, and water of the present invention. The lipid is uniformly dispersed in the kneaded meat made mainly from a meat or a fish meat. When less lipid is added, the transportability of the heated gel is not obtained, while when more is added, gel formation is inhibited. Preferably, from 5 to 20 wt. % is contained.

Furthermore, it was discovered that lubrication can be improved by using a solid oil/fat as the lipid contained in the raw material of the processed protein food. That is, one embodiment of the present invention is characterized in that a solid oil/fat is used as the lipid added to the raw material. A certain effect is obtained with a liquid oil/fat, but because the raw material contains a protein, when a liquid oil/fat is used, the oil/fat emulsifies and the effect thereof as a lubricant is diminished. When a solid oil/fat is dispersed and mixed as a solid oil/fat, the solid oil/fat near the inner walls of the tube melts and functions as a lubricant during heating/molding.

A solid oil/fat having a melting point higher than the temperature of the raw material mixture before heating is selected. Actually, an edible oil/fat having a melting point greater than the raw material mixture temperature before heating by not less than 7° C. will not melt during agitation. For instance, when a fish meat is the raw material, mixing is usually performed at a temperature of 15° C. or lower in terms of preventing protein denaturation. When the mixing temperature is 15° C., an oil/fat having a melting point of 22° C. or greater should be used. When the mixing temperature is 8° C., an oil/fat having a melting point of 15° C. or greater can be used. When the melting point is too high, texture of the finished food will be poor. Therefore, preferably a solid oil/fat having a melting point of from 15 to 70° C. is used. A solid oil/fat having a melting point of from 15 to 45° C. is particularly preferred. The amount added is such that the solid oil/fat content in the raw material mixture is preferably from 2 to 20 wt. %, particularly preferably from 5 to 10 wt. %. It is possible to use a mixture of solid oil/fat having various melting points or to use a mixture with liquid oil/fat. Preferably, the content of solid oil/fat and other lipids in the processed protein food overall is a total of from 2 to 35 wt. %.

The resulting kneaded meat is then subjected to degasification as necessary and moved continuously by a meat feeding pump or other conveyor in the direction opposite the direction of gravity through a heating tube, a vertical extrusion system, the long axis of which is in the direction of gravity. As the meat is being moved, heating is performed by Joule heating, microwave heating, or high-frequency heating, or a combination of these heating methods, by raising the temperature at the center of the kneaded meat to a temperature optionally set from 70 to 120° C. The gel formed in the heating tube is continuously extruded to obtain the heat molded processed product. A gel having good properties will not be obtained if the heating temperature is 70° C. or lower because heat denaturation of the protein will be insufficient. Moreover, although a gel will be formed at a temperature higher than 120° C., the gel structure will be damaged by the high temperature and gel strength will decrease.

By introducing the material to be heated to the tube after degasification, it is possible to prevent the formation of large air bubbles in the processed protein food. The formation of air bubbles can be suppressed by a casing without performing degasification of a sausage filled in a casing, when there is no casing, air bubbles that are macroscopically visible will be formed.

In addition, the inventors discovered that stable extrusion of a heated material is possible when a lubricant for facilitating smooth movement is present between the tube and material to be heated if the raw material contains no lipid. The "lubricant" in the present invention can be used for food and drink, capable of reducing the friction between the inner walls of the tube and the food and drink and facilitating smooth movement when the fluid food and drink is being moved in the tube. The lubricant is preferably a liquid at the time of use. More specifically, the lubricant may contain water, oil containing a vegetable oil/fat or an animal oil/fat, an alcohol, emulsifier, and the like. The lubricant may be selected in accordance with the food and drink to be fed in the tube.

One method for feeding the lubricant is a method for feeding an oil/fat and water between the material to be heated and the tube when the material to be heated is fed to the internal heating device. Excellent fluidity of the material to be heated inside the tube is obtained by feeding the lubricant. Specifically, the lubricant can be fed using a device wherein a feed part for feeding a lubricant is formed in front of the heating region of a tube. An example is a lubricant feed part disposed in the flow path of the material to be heated, as illustrated in FIG. 9.

An embodiment of the lubricant feed part of the present invention will be described in detail while referring to FIGS. 9 and 10.

Figure 9:
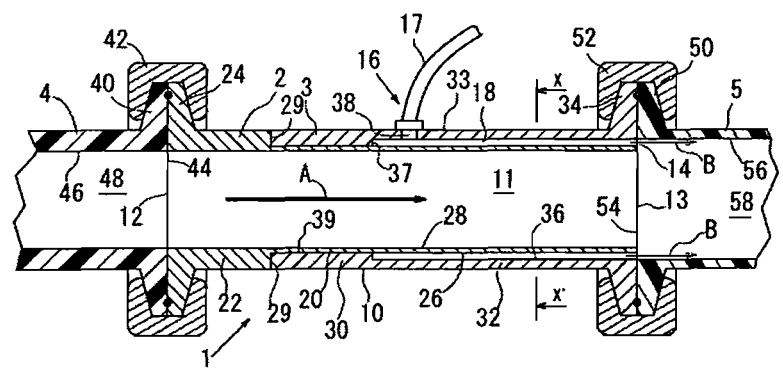
FIG. 9 is a cross-section illustrating a lubricant feeding device according to an embodiment of the present invention.
Figure 10:
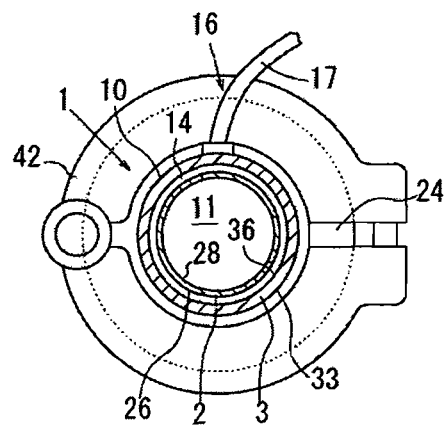
FIG. 10 is a cross-section in X-X' depicted in FIG. 9.

FIG. 9 is a cross-section illustrating a lubricant feeding device according to an embodiment of the present invention. FIG. 10 is a cross-section in X-X' depicted in FIG. 9.

As illustrated in FIG. 9, a lubricant feeding device 1 can be used by being anchored between a transport tube 4 for forming a flow path 48 and a tube 5 for forming a flow path 58 connected to the heating device.

The lubricant feeding device 1 has a tube 10 for forming a flow path 11 through which a fluid food and drink will flow. With regard to the tube 10, a feed part 16 for feeding a lubricant around the food and drink that exits from the flow path 11 is formed. The tube 10 is formed by combining a first tube 2 and a second tube 3.

Figure 2:
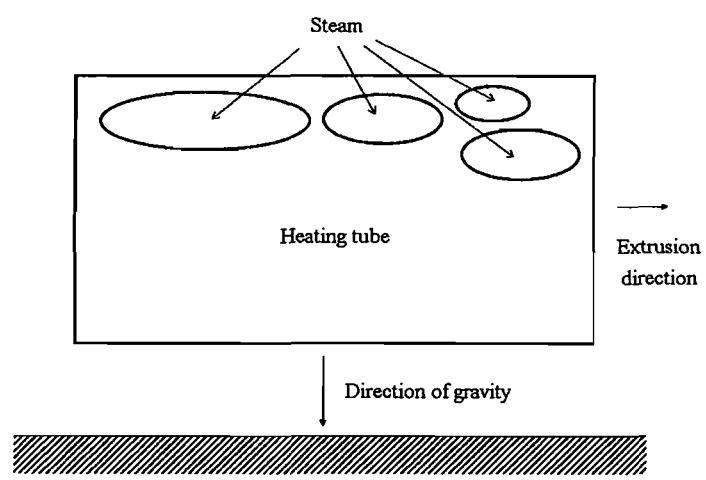
FIG. 2 is a schematic drawing illustrating a status of a steam when heating is performed by the horizontal extrusion system of prior art.
Figure 3:
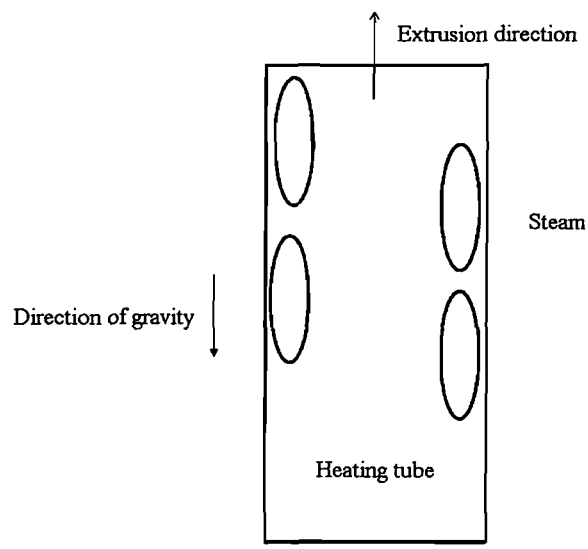
FIG. 3 is a schematic drawing illustrating a movement of a water vapor during heating in a tube when a material to be heated is heated using a vertical extrusion system.

The first tube 2 has a first part 20 inserted into the second tube 3 and a second part 22 communicating with a communicating part 40 of the transport tube 4. The first tube 2 is a cylinder that is round on the inside and outside of the horizontal cross section, as illustrated in FIG. 2, and has a first opening 12 and a second opening 13 at both ends. The first tube 2 has a first inner wall face 28 having the same inner diameter from the first opening 12 to the second opening 13, and the first inner wall face 28 forms the flow path 11.

The first opening 12 is an inlet of the flow path 11 where food and drink flows into the lubricant feeding device 1, and the second opening is an outlet of the flow path 11 where food and drink exits from the lubricant feeding device 1. The first opening 12 has the same inner diameter as the opening 44 of the transport tube 4 and the second opening 13 has a smaller inner diameter than the opening 54 of the transport tube 5.

A first outer wall face 26 of the first tube 2 has a uniform outer diameter of the first part 20 and an outer diameter that, at a step 29, expands from an end of the first part 20 to become greater than the outer diameter of the first part 20 of the second part 22. The second part 22 has a communicating part 24 having a maximum outer diameter projecting into a flange shape around the first opening 12. The communicating part 24 communicates, while sandwiching a sealing material, via a clamp 42, with a communicating part 40 that similarly is formed into a flange shape at the end of the adjacent transport tube 4. The outer diameter of the first outer wall face 26 at the first part 20 is less than an opening 54 of a transport tube 5 at least at the opening end of the first part 20.

The second tube 3 has a third part 30 in which the first part 20 of the first tube 2 fits and engages and a fourth part 32 for forming a portion of the feed part 16 for lubricant. The second tube 3 is a cylinder that is round on the inside and the outside of the horizontal cross-section as illustrated in FIG. 10.

The second outer wall face 33 of the second tube 3 has the same outer diameter along substantially the entire length, with the exception of a communicating part 34, which has a maximum outer diameter that projects into a flange shape around the third opening 3. The communicating part 34 communicates, while sandwiching a sealing material, via a clamp, with a communicating part 50 formed in a flange shape at the end of a transport tube 5.

A third part 30 has a third inner wall face 39 and a fourth part 32 has a second inner wall face 36, and the third inner wall face 39 expands at a step 37 to communicate with the second inner wall face 36. The diameter of the third inner wall face 39 is substantially the same as the outer diameter of the first part 20 of the first tube 2. The diameter of the second inner wall face 36 is greater than the outer diameter of the first part 20 and forms a space with the first outer wall face 26. The inner diameter of the second inner wall face 36 is the same as the inner diameter of the opening 54 of the transport tube 5.

The feed part 16 may include a feed path 18 constituted by an annular space between the first outer wall face 26 of the first part 20 of the first tube 2 and the second inner wall face 36 of the second tube 3, a feed port 14 where the feed path 18 opens toward the second opening 13, which is the exit of the tube 10, and a feed tube 17 for introducing lubricant to the feed path 18. The lubricant filled in the feed path 18 is fed around the food and drink from the feed port 14.

At a first end of the feed tube 17, a lubricant is pressurized from a lubricant pump (not illustrated) such that at least food and drink will not flow into the feed path 18 and is fed to the feed tube 17. A second end of the feed tube 17 is connected to a feed hole 38, which penetrates from the second outer wall face 33 to the second inner wall face 36 of the fourth part 32 of the second tube 2 and a lubricant is filled into the feed path 18. The lubricant filled into the feed path 18 moves along the first outer wall face 26 and is extruded in the direction of arrow B from the annular feed port 14 formed around the second opening 13. The lubricant extruded from the feed port 14 is fed around the food and drink moving in the transport tube 5 such that the food and drink moves smoothly against the inner wall face 56.

It should be noted that in this embodiment, the feed port 14 is formed at the opening end of the tube 10, but it is not limited thereto, and it can be formed at any position where lubrication of the food and drink moving in the transport tube 5 is possible. For instance, it can be disposed anywhere in the flow path 11 by making the feed path 18 shorter, or it can be formed as multiple holes anywhere inside the feed path 18 that penetrate to the flow path 11. The lubricant can thereby be fed around the food and drink moving in the flow path 11. In addition, the feed path 18 can be extended past the opening 54 to inside the flow path 58. Although the feed port 14 opens inside the transport tube 5 in this case, lubricant can be fed to around the food and drink that moves in the flow path 58.

The lubricant can be fed all around the material to be heated or to only a portion, and it can be fed continuously or intermittently.

The production method of the present invention can be performed by the following procedure.

A livestock meat or a marine product-derived meat containing a myofibrillar-derived salt-soluble protein is fed as the primary raw material to a kneader such as a silent cutter and thoroughly cut. The temperature at this time is the minimum temperature possible, preferably approximately 10° C. Salt is added to the raw material to thoroughly dissolve the myofibrillar-derived salt-soluble protein contained in the raw material. Then, a starch, a vegetable protein, spices and seasonings, emulsifiers, and the like are added as needed, and lipids are added in an amount of from 2 to 35 wt. % of the kneaded meat. The lipid may be an edible lipid, such as a vegetable oil, a hydrogenated oil, a pork tallow, or a beef tallow, or alternatively, a lipid contained in the original livestock meat or marine product-derived meat may be used. After lipid addition, the mixture is thoroughly kneaded to uniformly disperse and emulsify the added lipid. During kneading, degasification treatment is performed as needed.

The kneaded meat is continuously fed by a meat feeding pump, and the like to the vertical extrusion-type heating tube while being heated by Joule heating, microwave heating, high-frequency heating, or a combination thereof to the desired temperature from 70 to 120° C. For instance, two step heating whereby after heating to 30° C. initially, the product is heated to the desired temperature, multi-step heating as needed, or adjustment of the temperature-elevation rate during heating are possible. Adjustment can be optionally performed in order to obtain the optimal properties.

The kneaded meat that has been gelatinized due to heating is continuously subjected to heating/molding and extruded from a heating device without losing transportability because of the lipid contained in the kneaded meat. Furthermore, the steam generated on the inside due to heating moves in the same direction as the material to be heated, that is, opposite the direction of gravity, as a result of the vertical extrusion system and as a result, extrusion stability is obtained and the desired processed product can be continuously obtained.

Furthermore, by heating/molding while rotating the heating tube, it is possible to obtain the further desired product with no surface heating irregularities due to the rotation of the tube.

The livestock meat or marine product-derived meat of the present invention can be minced or ground fish, shell fish or mincemeat, and the like. Products of various diameters can be easily and continuously produced by selecting the appropriate tube diameter for the heating device.

Furthermore, the present invention includes an embodiment wherein heating/molding and vertical cutting are simultaneously performed. A processed protein food immediately after heating/molding is soft and can be easily cut. By disposing a strong and thin linear object such as a piano wire or a blade such as a rotary cutter in the extrusion flow path, it is possible to vertically cut the processed protein food by pressing the processed protein food onto the linear object, or by the blade. By combining multiple linear objects, the food can be cut into two, three, four, or eight equal parts, for instance, or it can be cut vertically into thin rods of from 3 to 5 mm such that tokoroten (gelidium jelly) is pushed through a mesh. Preferably, the linear object is disposed such that it can be inserted at an angle into the cross-section of the processed protein food.

Preferably, the processed protein food that has been extruded from the tube is supported by a pipe member, a roller, and the like such that it is introduced directly to a vertical cutting device when it is to be cut vertically.

The processed protein food of the present invention can be continuously produced as with a rope and therefore, is cut to the appropriate length in accordance with the purpose of use. Preferably, for cutting vertically, the product is cut to the appropriate length after being cut vertically.

Moreover, the present invention includes an embodiment wherein when heating/molding is performed, a product is produced by combining two or more types of materials as described below.

The processed protein food of the present invention can be produced by disposing a nozzle for feeding another mixture disposed in a pipe feeding the material to be heated into the tube, simultaneously feeding the material to be heated and the other mixture to the tube, heating/molding them in the tubes, and thereby obtaining a food having a form wherein the other mixture passes through a middle portion of the processed protein food.

There are no particular restrictions to the other mixture, but the other mixture must have viscosity such that it will not flow out from the processed protein food. Specifically, it is possible to make a pattern in the cut surface by passing through the outer material to be heated on the outer side a mixture of the same composition but a different color than the outer material to be heated. It is also possible to produce a flavored sausage by inserting a seasoning such as ketchup or mayonnaise. A seasoning of increased viscosity that does not flow out is preferable. The other mixture passing through the outer material to be heated is not limited to one type, and multiple mixtures can be passed through the outer material to be heated using multiple nozzles. It is possible to prevent mixing inside the tube by bringing the outer material to be heated and the mixture passing through the outer material to be heated to a uniform pressure. For instance, when a kneaded meat that has different colors than the outside is fed from a heart-shaped nozzle so as to passing through the outer material to be heated, a heart-shaped pattern can be formed in the cross-section of the finished sausage.

By simultaneously introducing multiple mixtures gelatinized by heating to the tube, it is possible to produce a processed protein food with stripes in two or three colors.

The present invention will now be explained in greater detail through the use of working examples, but is in no way limited to these working examples.

Working Example 1

The raw materials for a fish sausage were mixed to prepare a kneaded meat, the kneaded meat was fed to a vertical extrusion-type fluorine resin heating tube, and casing-free fish sausage was produced by Joule heating and/or microwave heating.

According to the composition in Table 1, the minced fish meat was salted by adding table salt, then other seasonings, a vegetable protein, a vegetable oil, and water were added, and the product was mixed and kneaded into a paste and the kneaded meat was prepared.

TABLE 1

| Composition No. | 1 | 2 | 3 |
|---|---|---|---|
| Minced fish meat | 44 | 41 | 39 |
| Vegetable protein | 10 | 9 | 8 |

TABLE 1-continued

| Composition No. | 1 | 2 | 3 |
|---|---|---|---|
| Seasoning | 8 | 7 | 6 |
| Vegetable oil | 8 | 15 | 7 |
| Added water | 30 | 27 | 40 |
| Total | 100 | 100 | 100 |

Figure 5:
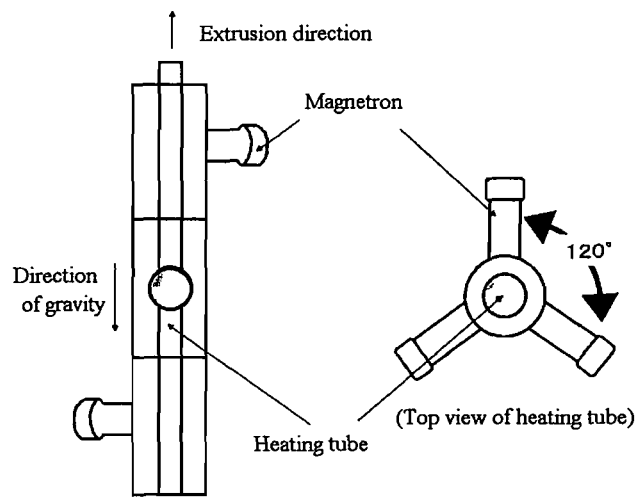
FIG. 5 is a schematic drawing illustrating an embodiment of a microwave heating device used when microwave heating is employed as an internal heating system.
Figure 6:
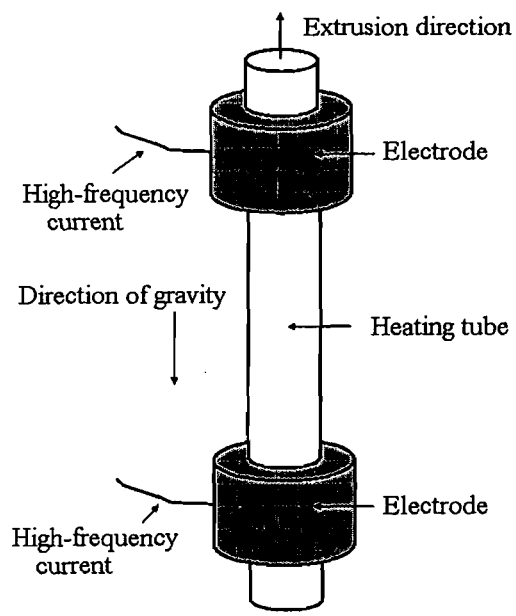
FIG. 6 is a schematic drawing illustrating an embodiment of a Joule heating device used when Joule heating is employed as the internal heating system.

Using the equipment and conditions in Table 2, the voltage and current for Joule heating were adjusted such that the heating temperature at the center of the extruded material to be heated would be 85° C. Moreover, the output of the magnetron for microwave heating was adjusted. The equipment used for continuous microwave heating was a microwave heating device wherein the tube was divided into three parts using metal walls disposed around the periphery of the tube, and a microwave generator (magnetron) attached at a phase of 120° to each of the three parts (FIG. 5). The equipment used for continuous Joule heating was a device wherein a pair of electrodes was disposed at the tube (FIG. 6). Both devices were devices that were sold for horizontal extrusion but were used for vertical extrusion by a method such as being turned 90° horizontally.

Each method produced a casing-free fish sausage that was not inferior to fish sausage produced by filling into a casing and retort treatment. Stable continuous production of casing-free fish sausage was possible with no clogging of the tube by kneaded meat.

TABLE 2

| Test No. | Heating method | Equipment used | Heating conditions (° C.) (Note 1) |
|---|---|---|---|
| 1 | Joule heating | Ring-type electrode Joule heating device, manufactured by Izumi Food Machinery Co. Ltd. | 85 |
| 2 | Microwave heating | Continuous microwave heating device, manufactured by Hiroden Ltd. | 85 |
| 3 | Joule heating + microwave heating | Ring-type electrode Joule heating device, manufactured by Izumi Food Machinery Co. Ltd. + Continuous microwave heating device, manufactured by Hiroden Ltd. | 85 (Note 2) |

(Note 1) Temperature at a center of the material to be heated.
(Note 2) The material to be heated was heated up to 40° C. by Joule heating and then was heated up to 85° C. by microwave heating.
Other: The meat feeding pump used was either a vacuum quantitative filling machine manufactured by Handtmann or the NEMO Pump manufactured by Heishin Ltd. The heating tube was a fluorine resin pipe having a diameter of 23 mm.

Working Example 2

Using the same kneaded meat and Joule heating device as in Working Example 1, heating while vertically extruding was performed under the conditions shown in Table 3.

Under the conditions shown in Table 3, it was possible to produce casing-free fish sausage that was not inferior to fish sausage produced by filling in a casing and retort treatment.

TABLE 3

| Composition No. | Flow rate (kg/hour) | Joule heating pipe diameter (mm) | Joule heating pipe length (mm) | Voltage (V) | Current (A) | Temperature elevation time (minutes)*1 |
|---|---|---|---|---|---|---|
| 1 | 50  | 23 | 1000 | 150 | 12 | 2 |
| 1 | 50  | 36 | 1000 | 200 | 15 | 2 |
| 2 | 50  | 36 | 1000 | 200 | 15 | 2 |
| 3 | 50  | 36 | 1000 | 200 | 15 | 2 |
| 1 | 100 | 36 | 1000 | 350 | 17 | 2 |
| 1 | 150 | 36 | 1000 | 400 | 20 | 2 |

*1 The temperature elevation time is the time it took the unheated kneaded meat (15° C.) to reach a temperature of 85° C. or higher at the center of the kneaded meat, and could be adjusted by adjusting a combination of the voltage, current and further, internal capacity or flow rate.

Working Example 3

Using the same kneaded meat and microwave heating device as in Working Example 1, heating while vertically extruding was performed under the conditions shown in Table 4.

Under the conditions shown in Table 4, it was possible to produce casing-free fish sausage that was not inferior to fish sausage produced by filling in a casing and retort treatment.

TABLE 4

| Composition No. | Flow rate (kg/hour) | Microwave heating pipe diameter (mm) | Microwave heating pipe length (mm) | Voltage (V) | Current (A) | Temperature elevation time (minutes)*1 |
|---|---|---|---|---|---|---|
| 1 | 35 | 23 | 900 | 200 | 21 | 1 |
| 2 | 35 | 23 | 900 | 200 | 21 | 1 |
| 3 | 35 | 23 | 900 | 200 | 21 | 1 |

*1 Temperature elevation time: Time it took the unheated kneaded meat (10° C.) to reach a temperature of 85° C. at the center of the kneaded meat.

Comparative Example 1

The same casing-free fish sausage as when the microwave heating device in Working Example 1 was used was produced by inclining the heating tube part at 45° rather than vertical.

By inclining the tube at 45°, the steam rose only upward of the tube as with a horizontal extrusion system and therefore, uniform heating could not be realized in that the top half was overheated and the bottom half was insufficiently heated. It was confirmed that extrusion at an inclination of not greater than 15° is necessary in order for the steam to rise uniformly in the tube.

Working Example 4

A device for rotating the tube will be described using FIG. 7. The heating device was the continuous microwave heating device HMTT24-12-01 manufactured by Hiroden Ltd. The heating tube was a Teflon (Dupont registered trademark) tube having an inner diameter φ of 23 mm. Using a rotary joint (swivel joint ASV-2Z25A, manufactured by Showa Giken Industrial Co., Ltd) for the junction of the pipe connecting the heating tube and the meat feeding pump that is not illustrated, an electric motor for rotating the tube was disposed at the base thereof. Kneaded fish meat having the composition shown by Composition No. 1 in Working Example 1 was fed to the heating device at 180 kg/hour using the meat feeding pump and the output of the magnetron was adjusted for heating such that the temperature at the center of the meat would become 85° C. The number of revolutions of the heating tube was set at 15 rpm. By way of comparison, manufacturing was performed under the same conditions without rotating the tube.

The results are shown in Table 5. When the heating tube was rotated, the extruded status of the material to be heated was very stable and the surface of the material to be heated was very smooth. On the other hand, when the heating tube was not rotated, the extrusion status of the material to be heated was unstable and the phenomenon of the material to be heated being emitted with steam occasionally was seen. Moreover, blisters produced by irregular heating were also observed at the surface of the material to be heated. The "surface status" in Table 5 refers to the status when the surface of a heated material to be heated was photographed with the μ720 SW digital camera manufactured by Olympus Corporation, the image was gray scale treated in 256 steps using the image processing software Photoshop Ver. 9.0 manufactured by Adobe Systems Incorporated, and the average pixel value of each image and the standard deviation was calculated.

When the surface status was rough, the average pixel value is lower (darker) and the standard deviation is greater (there are more irregularities) than when the surface status is smooth.

TABLE 5

| Material to be heated feed rate (kg/hour) | Number of revolutions of the tube (rpm) | Extrusion status | Surface status | Surface status (average value + standard deviation) |
|---|---|---|---|---|
| 180 | 0  | Unstable | Blisters | 132 ± 66 |
| 180 | 15 | Good     | Smooth   | 155 ± 11 |

Working Example 5

Figure 11:
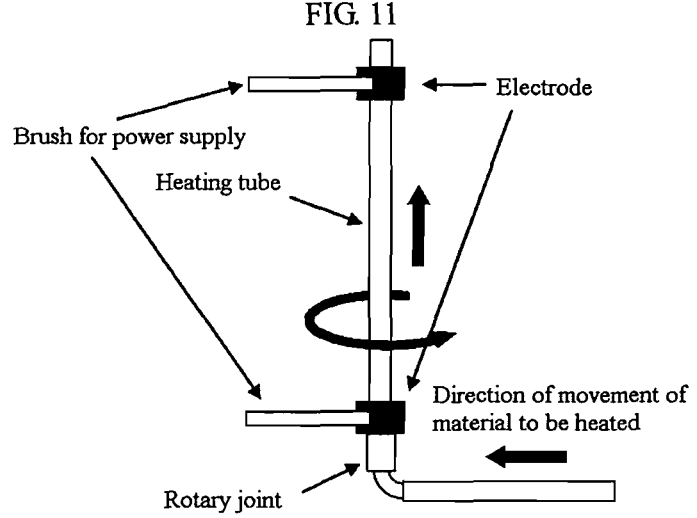
FIG. 11 is a schematic drawing illustrating an embodiment when the tube is rotated using Joule heating as the internal heating system of the present invention.

Using the same Joule heating device as in Working Example 1 (FIG. 6) and the swivel joint ASV-2Z 25A as in Working Example 4, the tube could be rotated (FIG. 11).

A casing-free fish sausage that was not inferior to a fish sausage produced by filling in a casing and retort treatment was obtained by Joule heating. The tube was not clogged with the kneaded meat and the surface of the material to be heated was very smooth. Stable continuous production of casing-free fish sausage was possible.

Working Example 6

The kneaded meat for fish sausage was prepared using the composition in Table 6. The oil/fat in Table 7 was used as the solid oil/fat. A combination of the oil/fat in the kneaded meat was a liquid oil/fat (essential rapeseed oil made by J-Oil Mills, Inc.) and the solid oil/fat was used in the added amount shown in Table 8.

TABLE 6

|  | Composition 1 | | Composition 2 (oil/fat free) | |
| --- | --- | --- | --- | --- |
|  | kg | wt. % | kg | wt. % |
| Minced fish meat | 95.0 | 39.4 | 95.0 | 39.4 |
| Vegetable protein | 14.0 | 5.8 | 14.0 | 5.8 |
| Starch | 23.0 | 9.5 | 23.0 | 9.5 |
| Table salt | 3.2 | 1.3 | 3.2 | 1.3 |
| Seasonings and the like | 14.9 | 6.2 | 14.9 | 6.2 |
| oil/fat | 19.0 | 7.9 | — | — |
| Added water | 72.0 | 29.9 | 81.0 | 33.6 |
| Total | 241.1 | 100.0 | 231.1 | 95.9 |

TABLE 7

| Solid oil/fat | Manufacturer | oil/fat base | Melting point (clouding point) |
| --- | --- | --- | --- |
| F-3 oil | ADEKA Corporation | Palm | 22.6° C. |
| Palm super olein | ADEKA Corporation | Palm | (4° C.) |
| Butter peanut fat | ADEKA Corporation | Palm | 45° C. |
| Crown lard | ADEKA Corporation | Pork tallow | 36~38° C. |
| Head 41° C. | ADEKA Corporation | Beef tallow | 38~41° C. |
| Palm ultrahydrogenated oil | Yokozeki oil/fat Industries Co., Ltd. | Palm | 58.9° C. |
| Rapeseed ultrahydrogenated oil | Yokozeki oil/fat Industries Co., Ltd. | Rapeseed | 68.5° C. |
| Multi Ace 50S | The Nisshin Oillio Group, Ltd. | Palm | 10° C. |
| Multi Ace 50S | The Nisshin Oillio Group, Ltd. | Palm | 10° C. |
| Clear Select L-R | The Nisshin Oillio Group, Ltd. | Palm | 15° C. |

TABLE 8

|  | Amount of liquid oil/fat added | Solid oil/fat | Melting point (clouding point) | Amount added | Kneaded meat temperature | Extrusion stability | Quality |
| --- | --- | --- | --- | --- | --- | --- | --- |
| Sample 1 | Not added | Not added |  |  | 14.8° C. | X | X |
| Sample 2 | 7.8% | Not added |  |  | 14.2° C. | X | X |
| Sample 3 | 5.8% | F-3 oil | 22.6° C. | 2.0% | 14.0° C. | Δ | ○ |
| Sample 4 | 4.1% | F-3 oil | 22.6° C. | 3.7% | 14.8° C. | ○ | ○ |
| Sample 5 | Not added | F-3 oil | 22.6° C. | 7.8% | 14.4° C. | ○ | ○ |
| Sample 6 | 4.1% | Palm super olein | (4° C.) | 3.7% | 14.5° C. | X | X |
| Sample 7 | 4.1% | Butter peanut fat | 45° C. | 3.7% | 13.8° C. | ○ | ○ |
| Sample 8 | 4.1% | Crown lard | 36~38° C. | 3.7% | 14.4° C. | ○ | ○ |
| Sample 9 | 4.1% | Head 41° C. | 38~41° C. | 3.7% | 14.9° C. | ○ | ○ |
| Sample 10 | 4.1% | Clear Select L-R | 15° C. | 3.7% | 13.1° C. | X | X |
| Sample 11 | 4.1% | Palm ultrahydrogenated oil | 58.9° C. | 3.7% | 13.7° C. | ○ | ○ |
| Sample 12 | 4.1% | Rapeseed ultrahydrogenated oil | 68.5° C. | 3.7% | 13.7° C. | ○ | ○ |
| Sample 13 | 4.1% | Multi Ace 50S | 10° C. | 3.7% | 15.6° C. | Δ | Δ |
| Sample 14 | 4.1% | Multi Ace 50S | 10° C. | 3.7% | 9.7° C. | Δ | Δ |
| Sample 15 | 4.1% | Clear Select L-R | 15° C. | 3.7% | 8.3° C. | ○ | ○ |

Using the continuous microwave heating device manufactured by Hiroden Ltd., the output of the magnetron was adjusted to a heating temperature such that the temperature at the center of the extruded material to be heated would be 85° C. For continuous microwave heating, a microwave heating device wherein the tube was divided into three parts using metal walls disposed around the periphery of the tube and a microwave generator (magnetron) was attached at a phase of 120° to each of the three parts (FIG. 5). The tube for heating the kneaded meat was a fluorine resin pipe having a diameter of 23 mm.

The results are shown in table 8. The extrusion stability was evaluated based on whether or not a fish sausage could be stably produced by microwave heating. ○ indicates that stable continuous extrusion was possible. Δ and x indicate that steam was emitted, the sausage was not uniformly extruded, the tube was clogged, or there was partial overheating, with the extent thereof being not serious or somewhat serious. Moreover, the quality was evaluated by the uniformity of the heated status of the sausage.

When no oil/fat was added, or only liquid oil/fat was added, as in Samples 1 and 2, stable extrusion was not possible, but when solid oil/fat was added in an amount of 2% or greater as in Samples 3 to 5, stable extrusion was possible.

Samples 6 to 12 are for comparing the differences due to the melting point of the solid oil/fat. Although a solid oil/fat having a low melting point as in Samples 6 and 10 had no effect, a sufficient effect was seen with Samples 7 to 9, 11, and 12. The correlation between the melting point and the kneaded meat temperature is more important than the absolute melting point, and as shown in Samples 13 to 15, even when a solid oil/fat having the same melting point is used, a good result is obtained as long as the temperature of the kneaded meat is low and is a temperature at which the solid oil/fat will not melt. It is obvious from Sample 15 that a sufficient effect is obtained as long as the kneaded meat temperature is 7° C. higher than the melting point.

INDUSTRIAL APPLICABILITY

Internal heating can efficiently convert electrical energy to thermal energy. Using this characteristic, it is possible to reduce petrochemical fuel consumption and greenhouse gases, and it is also possible to provide a heating method that is useful in the food processing industry. According to the production method of the present invention, it is possible to continuously produce a variety of protein-containing foods, including the fish sausage that was previously produced by being filled in a casing.

REFERENCE NUMERALS

1 Lubricating device
1a Lubricating device
2 First tube
2a First tube
3 Second tube
3a Third tube
4 Transport tube
5 Transport tube (heating tube)
8 Pump
9 Heating device
10 tube
11 Flow path
12 First opening (inlet of flow path)
13 Second opening (outlet of flow path)
14 Feed port
14a Feed port
16 Feed part
17 Feed tube
18 Feed path
18a Annular flow path
18b Linear flow path
20 First part
22 Second part
22a Fifth part
24 Communicating part
26 First outer wall face
26a Projection
28 First inner wall face
29 Step
29a Step
30 Third part
31 First opening
32 Fourth part
33 Third outer wall face
34 Communicating part
36 Second inner wall face
36a Second inner wall face
37 Step
38 Feed hole
39 Third inner wall face
40 Communicating part
42 Clamp
44 Opening
46 Inner wall
48 Flow path
50 Communicating part
52 Clamp
54 Opening
56 Inner wall face
58 Flow path
A Arrow
B Arrow

The invention claimed is:

1. A method for producing a processed protein food by thermally coagulating and molding a fluid mixture containing a protein, a lipid, and water continuously by an internal heating system while moving the mixture within a tube, the method comprising:
   (a) with the tube arranged vertically or substantially vertically having a tilt angle of no greater than 15° from the vertically arranged position of the tube, heating the mixture by the internal heating system so as to mold the mixture, while feeding the mixture upward from a bottom of the tube so as to move the mixture within the tube upwardly from the bottom of the tube, or
   (b) with the tube arranged vertically or substantially vertically having a tilt angle of no greater than 15° from the vertically arranged position of the tube, heating the mixture by the internal heating system so as to mold the mixture, while feeding the mixture upward from the bottom of the tube so as to move the mixture within the tube upwardly from the bottom of the tube and heating the mixture so as to mold the mixture while rotating the tube around a rotation axis, the rotational axis being a center line in a length direction of the tub,
   wherein the vertically arranged position of the tube is a position in a same direction as a direction of gravitational force.

2. The method for producing a processed protein food according to claim 1, wherein the internal heating system is microwave heating, Joule heating, or high-frequency heating.

3. The method for producing a processed protein food according to claim 1, wherein the heating is performed such that a temperature at a center of the mixture is in a range from 70 to 120° C.

4. The method for producing a processed protein food according to claim 1, wherein a rotation speed of the tube in the step (b) is in a range from 5 to 30 rpm.

5. The method for producing a processed protein food according to claim 1, wherein a lubricant is fed between the tube and the mixture.

6. The method for producing a processed protein food according to claim 1, wherein the mixture is introduced to the tube after being subjected to degasification.

7. The method for producing a processed protein food according to claim 1, wherein after the heating the mixture by the internal heating system so as to mold the mixture in the tube, the processed protein food is cut vertically into two or more parts by a vertical cutting device disposed near an outlet of the tube.

8. The method for producing a processed protein food according to claim 7, wherein the vertical cutting device is a linear object or a blade disposed in a path of the processed protein food being extruded from the tube.

9. The method for producing a processed protein food according to claim 1,
wherein a second mixture is fed into a pipe that feeds the second mixture into the tube by disposing a nozzle feeding the second mixture in the pipe,
the mixture and the second mixture are simultaneously fed into the tube, and
the mixture and the second mixture are subjected to heating so as to be molded in the tube so that a food in which the second mixture passes through a middle portion of the processed protein food is produced.

* * * * *